(12) United States Patent
Kono et al.

(10) Patent No.: US 6,743,508 B2
(45) Date of Patent: Jun. 1, 2004

(54) FEP PELLET

(75) Inventors: Hideki Kono, Osaka (JP); Takayuki Hirao, Decatur, AL (US); George Lin, Orangeburg, NY (US); Kazuyuki Fukuda, Osaka (JP)

(73) Assignee: Daikin America, Inc., Orangeburg, NY (US)

( * ) Notice: Subject to any disclaimer, the term of this patent is extended or adjusted under 35 U.S.C. 154(b) by 0 days.

(21) Appl. No.: 10/046,702

(22) Filed: Jan. 17, 2002

(65) Prior Publication Data

US 2003/0157324 A1 Aug. 21, 2003

(51) Int. Cl.$^7$ .................................................. B32B 5/16
(52) U.S. Cl. ..................... 428/402; 428/384; 428/421; 428/463; 526/247; 525/200; 427/117
(58) Field of Search .............................. 428/463, 384, 428/421, 402; 526/247; 525/200; 427/117

(56) References Cited

U.S. PATENT DOCUMENTS

| | | | |
|---|---|---|---|
| 2,946,763 A | | 7/1960 | Bro et al. |
| 3,085,083 A | | 4/1963 | Schreyer et al. |
| 3,969,435 A | | 7/1976 | Bailey et al. |
| 4,001,351 A | | 1/1977 | Roura |
| 4,029,868 A | | 6/1977 | Carlson |
| 4,105,716 A | | 8/1978 | Sakai et al. |
| 4,150,013 A | * | 4/1979 | Punderson .................. 524/506 |
| 4,552,925 A | | 11/1985 | Nakagawa et al. |
| H130 H | | 9/1986 | McDermott et al. |
| 4,626,587 A | | 12/1986 | Morgan et al. |
| 4,703,095 A | * | 10/1987 | Nakagawa |
| 4,749,752 A | | 6/1988 | Youlu et al. |
| 5,317,061 A | * | 5/1994 | Chu et al. .................. 525/200 |
| 5,677,404 A | * | 10/1997 | Blair |
| 5,688,885 A | | 11/1997 | Blair |
| 5,703,185 A | * | 12/1997 | Blair |

FOREIGN PATENT DOCUMENTS

| | | |
|---|---|---|
| EP | 0 789 038 B1 | 8/1997 |
| GB | 1210794 | 10/1970 |
| GB | 1231333 | 5/1971 |
| GB | 1316222 | 5/1973 |
| JP | 49 10290 | 1/1974 |
| JP | 50-115293 | 9/1975 |
| JP | 52-887 | 1/1977 |
| JP | 52-73994 | 6/1977 |
| JP | 2-155907 | 6/1990 |
| WO | WO 98/09784 A1 | 3/1998 |
| WO | WO 00/44797 A1 | 8/2000 |
| WO | WO 01/18076 A1 | 3/2001 |
| WO | WO 01/18076 * | 3/2001 |
| WO | WO 01/19582 A1 | 3/2001 |
| WO | WO 01/36504 * | 5/2001 |
| WO | WO 01/36504 A1 | 5/2001 |

* cited by examiner

*Primary Examiner*—Leszek Kiliman
(74) *Attorney, Agent, or Firm*—Sughrue Mion, PLLC

(57) ABSTRACT

An FEP pellet having a volatile content of 0.2% by weight or less. The FEP pellet satisfies the following requirements (i) and (ii) when used to form a insulating material coating a core wire by extrusion coating at a coating speed of 2,800 ft/min.: (i) an adhesive strength between the insulating material and said core wire of 0.8 kg or more; and (ii) an average number of cone-breaks in the insulating material of one or less per 50,000 feet of the coated core wire.

11 Claims, 1 Drawing Sheet

FEP PELLET

BACKGROUND OF THE INVENTION

1. Field of the Invention

The present invention relates to an FEP pellet and more specifically, an FEP pellet having improved moldability which can suitably be used in coating extrusion, particularly in high-speed molding, for molding an insulated cable such as a wire and a cable.

2. Description of the Related Art

Tetrafluoroethylene (TFE)/hexafluoropropylene (HFP) copolymer has superior heat resistance, chemical resistance, extrusion moldability and the like, and in addition, has a superior electric insulating property and high-frequency property with a low dielectric tangent. Therefore, it is used for insulating cable such as a cable and a wire, and such insulated cable is suitably used as a communication cable. The communication cable includes a data transmission cable such as a LAN cable.

TFE/HFP copolymer also has low flammability and low smoking properties. Thus, insulated cable made from such a copolymer can be used as a plenum cable, which is laid, for example, on the back of a ceiling of a building (plenum area) and strictly regulated for preventing the spread of fire.

The insulated cable comprises a core wire such as a cable and an insulating material formed from a resin such as a TFE/HFP copolymer coating the core wire. In general, the insulated cable is manufactured by extrusion coating in which molten resin is extruded in the shape of a tube, drawn down by inserting a core wire through the center portion of the resin tube in its axial direction, and the core wire coated with the resin is then taken up.

The term "draw-down" as used herein means extending a molten resin extruded from a die having an opening of relatively large sectional area to its final intended dimensions. The draw-down is characterized by a draw-down ratio (DDR), which is the ratio of the sectional area of the opening of the die to the sectional area of the insulated material of the final product. In general, the draw-down ratio is suitably from 50 to 150. Because draw-down extends the resin in the above-described manner, elongation melt breakage (cone-breaks) which are discontinuous portions generated in the insulating material, tend to occur.

The term "insulated" cable as used herein means a cable or wire coated with an insulating material.

In recent years, an increase in molding speed has been desired to enhance productivity and to reduce cost, and there is a demand to increase the speed at which the insulated core wire is taken up to thereby increase the coating rate. When the coating rate is increased, the insulating material thus obtained generally tends to suffer from cone-breaks as a result of draw-down even if the draw-down ratio is the same as used at lower coating rates. Moreover, adhesion to the core wire is lowered.

A TFE/HFP copolymer which can withstand an increased coating rate is in demand. Although the TFE/HFP copolymer is manufactured, e.g., by water-soluble emulsion polymerization or the like, the polymer thus obtained has a functional group such as a carboxyl group originating mainly from a reaction initiating agent at the dyads or ends of the main chain thereof. Thus, a resulting problem is that the polymer generates foaming in a high-temperature atmosphere such as during melt processing to thereby cause cone-breaks.

In order to avoid this problem, conventional TFE/HFP copolymers are generally subjected to end stabilizing treatment. The end stabilizing treatment includes changing an unstable group at the end to a stable group such as a difluoromethyl group or eliminating an unstable group by applying high temperature and/or high shearing force after polymerization as disclosed, for example, in U.S. Pat. No. 4,626,587, Japanese Kokai Publication Hei-10-80917 and the like.

The TFE/HFP copolymer to which such end stabilizing treatment has been completely applied has a low volatile content. However, if it is used for the coating extrusion, adhesion with the core wire is inferior, and in particular, a copolymer having a completely fluorinated and group causes severe shrink-back. Such a molding method is disclosed in WO 00/44797 and the like which comprises using a TFE/HFP copolymer having a melt flow rate (MFR) of 24 (g/10 min.) and a coating speed set at less than 2,000 feet/min. However, since the coating speed has further increased in recent years, the problem of shrink-back may have worsened.

Because a conventional TFE/HFP copolymer is subjected to high temperature and high shearing force at the end stabilizing treatment, the molecular weight distribution is generally narrow. If such a conventional TFE/HFP copolymer is used for the coating extrusion and if an attempt is made to increase the coating speed, stable molding can be carried out at a low to medium speed, however, when the speed exceeds a certain extent, cone-breaks can suddenly occur.

For increasing the critical speed below which cone-breaks do not occur, for example, Japanese Kokoku Publication Hei-2-7963 discloses a process for increasing melt tension by extending the molecular weight distribution. In the embodiment of this process, however, one having low coating speed, and a TFE/HFP copolymer having an MRF of 14 (g/10 min.) or less is disclosed.

Die swell is considered to be an index for the molecular weight distribution. In order to prevent cone-breaks by increasing the draw-down rate during coating extrusion, the die swell preferably has a large value. In a conventional TFE/HFP copolymer, however, because the die swell ordinarily decreases remarkably during end stabilizing treatment or the pelletizing step to cause melt fracture, high-speed coating extrusion is difficult.

Although a process of coating extrusion of a cable with a TFE/HFP copolymer having a certain die swell is disclosed in WO 01/36504, this process specifies, as the TFE/HFP copolymer, a powder obtained by polymerization.

In order to increase the speed of the coating extrusion, it is generally preferred to reduce the melt viscosity of the resin. On the other hand, resistance to stress cracking of the resin decreases because of the lowered melt viscosity.

U.S. Pat. No. 4,029,868 and Japanese Kokoku Publication Sho-63-2281 propose to carry out copolymerization using perfluoro(alkyl vinyl ether) (PFAVE) as a third monomer component of a TFE/HFP copolymer in order to provide resistance to stress cracking.

U.S. Pat. Nos. 5,677,404 and 5,703,185 disclose a TFE/HFP copolymer obtained by carrying out copolymerization using PFAVE as a third component. These patent publications disclose that a PEVE-based TFE/HFP copolymer comprising perfluoro(ethyl vinyl ether) (PEVE) is superior in MIT bending life as compared to a PPVE-based TFE/HFP copolymer comprising perfluoro(propyl vinyl ether) (PPVE) as PFAVE, hence it is possible to increase the coating speed.

However, no mention is made to the adhesive strength of the insulating material to the core wire, or to cone-breaks.

SUMMARY OF THE INVENTION

In view of the above-mentioned problems of the prior art, an object of the present invention is to provide an FEP pellet for extrusion coating of cable with no occurrence of elongation melt breakage such as cone-breaks as well as having excellent adhesive strength between an insulating material and a core wire at high coating speeds such as 2,800 ft/min.

The FEP pellet of the present has a volatile content of 0.2% by weight or less, and satisfies the following requirements (i) and (ii) when used to form an insulating material coating a core wire by extrusion coating at a coating speed of 2,800 ft/min.:

(i) an adhesive strength between the insulating material and the core wire of 0.8 kg or more; and (ii) an average number of cone-breaks in the insulating material of one or less per 50,000 ft of the coated core wire.

The invention is described in further detail below.

BRIEF DESCRIPTION OF THE DRAWING

The FIG. 1 illustrates the measuring device (metal plate having a columnar hole) used to evaluate adhesive strength of the insulating material with the core wire.

DETAILED DESCRIPTION OF THE INVENTION

Figure 1:
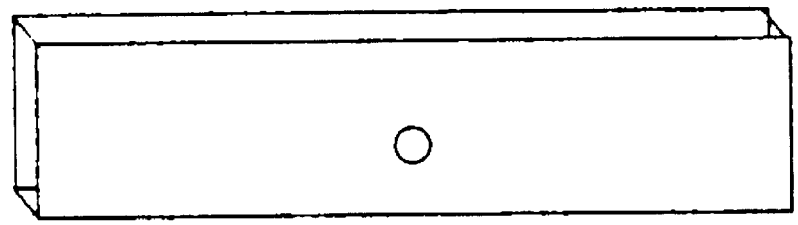

As used herein, FEP pellet means a pellet comprising a copolymer obtained by copolymerizing monomer components containing tetrafluoroethylene (TFE) and hexafluoropropylene (HFP). In the present specification, the above-mentioned copolymer is referred to as "FEP".

The above-mentioned FEP may be a binary copolymer using solely TFE and HFP as monomer components. As used herein, the above-mentioned binary copolymer is referred to as "unmodified FEP".

The above-mentioned FEP may also be a ternary copolymer containing units derived from TFE, HFP and a small amount of a perfluoro vinyl ether as monomer components. As used herein such a ternary copolymer is referred to as "modified FEP". One, two or more species of the above-mentioned perfluoro vinyl ether may be used.

The above-mentioned perfluoro vinyl ether is not particularly limited and, for example, includes an unsaturated perfluoro compound represented by the following general formula:

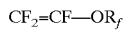

where $R_f$ is a perfluoroaliphatic hydrocarbon group. As used herein, a perfluoroaliphatic hydrocarbon group means an aliphatic hydrocarbon group in which all of hydrogen atoms linked to the carbon atoms are replaced with fluorine atoms. The above-mentioned perfluoroaliphatic hydrocarbon group may have one or more ether oxygens.

An example of the above-mentioned perfluoro vinyl ether includes perfluoro(alkyl vinyl ether) (PFAVE). PFAVE is a compound represented by the following general formula:

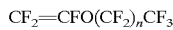

where n is an integer of 0 to 3. One, two or more species of PFAVE may be used. As PFAVE, perfluoro(ethyl vinyl ether) (PEVE) and perfluoro(propyl vinyl ether) (PPVE) are preferred, and PPVE is more preferred since it imparts superior MIT bending life as described below, and can readily increase the speed of the coating extrusion.

As the above FEP, modified FEP comprising PFAVE as the perfluoro vinyl ether is preferable since it can increase the resistance to stress cracking. As used herein, such modified FEP is referred to as "PFAVE-modified TFE/HFP copolymer".

The weight ratio of the contents of TFE, HFP and optionally PFAVE as monomer components of the above-mentioned FEP is not particularly limited as long as the FEP pellet of the present invention has the below-described characteristics, however, the weight ratio of TFE:HFP:PFAVE is preferably 70 to 90:10 to 20:0 to 10. If the content of PFAVE is within the above range, sufficient draw-down is possible, and it is also possible to maintain high resistance to stress cracking. More preferably, the ratio is 75 to 95:10 to 20:0 to 5.

The percentage of the TFE, HFP and PFAVE contents as monomer components of the above-mentioned FEP is also called a monomer composition, and is a value obtained by NMR analysis. The monomer composition can also be measured by infrared absorption spectrum analysis as described in Japanese Kokoku Publication Sho-63-2281.

The FEP pellet according to the present invention may contain other components as needed. The above-mentioned additional components are not particularly limited and include, for example, various kinds of fillers, stabilizers, lubricants and other conventional additives.

The FEP pellet of the present invention is suitably used in coating extrusion for insulating a core wire. The above-mentioned FEP pellet is melted by heating within an extruder for coating a core wire and extruded from a die, and then drawn down by coating the core wire to thereby form an insulated cable. The above-mentioned insulated cable comprises a core wire coated with the extruded FEP material.

As used herein, the speed at which the core wire coated by the above coating extrusion is reeled up is referred to as "covering speed". The coating speed is expressed by the length of insulated core wire length reeled up over a period of one minute (expressed in feet "ft").

The FEP pellet according to the present invention satisfies the following requirements (i) and (ii) when the above coating extrusion is carried out at a coating speed of 2,800 ft/min:

(i) the adhesive strength between the above-mentioned insulating material and the core wire is 0.8 kg or more.

An adhesive strength between the insulating material and the core wire of, for example, 3 kg or less will be sufficient as long as it is 0.8 kg or more. It is preferably 0.8 to 2 kg, more preferably 1 to 2 kg.

The adhesive strength between the insulating material and the core wire decreases as the coating speed increases. This relates to deterioration of the resin. In general, when the coating speed increases under a constant temperature profile, the temperature of the resin increases, which shortens the retention time of the resin in the extruder. Although it may be considered that the increase of the resin temperature may degrade the resin, studies conducted by the present inventors reveal that the extent of degradation of the resin is more severely affected by the retention time of the resin rather than an increase in the resin temperature. However, the FEP pellet of the present invention is advantageous in that the adhesive strength with the core wire of the extruded resin is sufficiently high even if the coating speed is increased and the retention time of the resin is shortened as mentioned above.

The reason why the FEP pellet of the present invention provides excellent adhesive strength is not clear. However, it is considered that the above-mentioned FEP has a functional group which can be changed to contribute to increased adhesion with the core wire when extruded at high temperature. As used herein, such functional group is referred to as an "adhesion factor", and if the adhesion factor is at the end of the polymer, such end is referred to as an "adhesion terminus".

The reason why the above adhesion terminus adheres to the core wire is not clear. However, it is considered that the increased adhesion is due to chemical reaction and/or high affinity with the core wire.

The above-mentioned adhesion terminus is not particularly limited as long as it contributes to enhanced adhesion with the core wire at high temperature, and includes, for example, a functional group which is generally known to be unstable at high temperature such as —COOM, —$SO_3$M, —O$SO_3$M, —$SO_2$F, —$SO_2$Cl, —COF, —$CH_2$OH, —CON$H_2$ and —CF=$CF_2$ and the like. Here, M is an alkyl group, a hydrogen atom, a metallic cation or a quaternary ammonium cation.

The number of groups at the above adhesion terminus in the FEP pellet of the present invention depends on the total content of the above adhesion termini in the copolymer the kind of adhesion terminus, MFR, die swell, monomer composition and the like. In the case of, for example, —COF, —COOH and —$CH_2$OH, under conditions such that the total number of these three groups is 15 to 150 and the total number of —COF and —COOH group is 2 to 25, preferably —COF is 0 to 5, —COOH is 2 to 25, and —$CH_2$OH is 0 to 300. These are numbers of functional groups per 1,000,000 carbon atoms.

It has generally been believed that such adhesion terminus is preferably and completely removed by carrying out a terminus stabilizing treatment described below in order to lower the volatile content. The FEP pellet of the present invention, which has a volatile content within the range specified herein, can have the above adhesion termini by controlling the terminus stabilizing treatment. According to the present invention, since the above-mentioned adhesion terminus provides sufficient adhesive strength with the core wire, it is unnecessary to take special measures such as annealing in order to obtain the desired adhesion strength with the core wire.

(ii) An average number of cone-breaks in the insulating material is one or less per 50,000 ft of the coated core wire.

As used herein, a cone-break is an irregularity of the surface in which the insulating material does not completely cover the core wire.

Provided that the number of cone-breaks is within the above-mentioned range, complete covering can be carried out even if a coating speed as high as 2,800 ft/min or more is employed, so that a high-quality insulated cable is obtained. Preferably, the number of cone-breaks is one or less on average per 100,000 ft of the coated core wire, more preferably one or less on average per 150,000 ft of the coated core wire.

The FEP pellet of the present invention has a volatile content of 0.2% by weight or less. Generally, the volatile components originate from the above adhesion terminus, decomposed portions of the polymer main chain, an oligomer generated during polymerization, a residual solvent due to insufficient deaeration during melt-pelletization and the like. If the volatile content exceeds 0.2% by weight, foam generates in the above insulating material, and together with the occurrence of the thinning of the insulating material due to draw-down, spark-out and thus cone-breaks occur. Thus, molding is unstable, and it becomes difficult to coat at high speed. The volatile content may be, for example, 0.07% by weight or more as long as it is within the above-mentioned range, and preferably 0.07 to 0.2% by weight. If the volatile content is less than the lower limit thereof, there are cases in which the above-mentioned adhesion termini are too few. Hence, the adhesion between the above insulating material and the core wire is lessened to result in molding defects and even the moldability is not sufficiently improved in some cases.

Preferably, the FEP pellet of the present invention has an MFR of 30 (g/10 min.) or more. When the MFR is within the above-mentioned range, sufficient draw-down is possible. Thus, it becomes possible to maintain high productivity. Further, even if slight melt fracture occurs during extrusion, self-flow tends to occur by the time it cools down and solidifies, whereby the insulating material thus obtained has a smooth surface with no melt fracture marks. It thus becomes easy to carry out coating at a high-speed as mentioned above. If the MFR is less than 30 (g/10 min.), the extent of melt fracture becomes severe, cone-breaks or spark-out due to melt fracture may be observed in some cases, and it tends to be difficult to increase the coating speed. The MFR may be 50 (g/10 min.) or less within the above-mentioned range, and more preferably is 30 to 45 (g/10 min.) since it becomes easy to increase the above coating speed.

Preferably, the FEP pellet of the present invention has a die swell value of 18% or more. The die swell is generally an index for the molecular weight distribution, and the greater the die swell, the wider the molecular weight distribution. On the contrary, the smaller the die swell the narrower the molecular weight distribution. However, strictly speaking, the die swell reflects the amount of components that exhibit strain hardening. Strain hardening reflects a force that resists elongation melt breakage. Namely, the die swell is an index showing resistance to elongation melt breakage.

Therefore, if the die swell is within the above-mentioned range in the present invention, the component that exhibits the above-mentioned strain hardening is present in large amount, so that it is difficult for melt fracture to occur under a flowing status during extension such as draw-down. The die swell value is more preferably 18 to 35%. If it is less than 18%, melt-tension during molding becomes small so that cone-breaks easily occur, and if it exceeds 35%, the melt-tension is too high, so that irregularities occur on the insulating material thus obtained to thereby amplify variations in the wire diameter. Hence, the moldability tends to be unstable. More preferably, the die swell value is 20 to 28%.

A process for controlling the die swell of the FEP pellet of the present invention within the above-mentioned range is not specifically limited. For example, a known method for increasing strain hardening can be used, and an example thereof includes addition of ultra-high molecular weight material, addition of long-chain branched high molecules or the like.

As an index of the molecular weight distribution, the ratio of weight average molecular weight/number average molecular weight (Mw/Mn) is generally known. This index has often been considered as showing resistance to melt fracture. However, in principle, this understanding is not exactly correct. On the other hand, die swell is useful as an index showing resistance to melt fracture as mentioned above. Accordingly, even if the Mw/Mn value is as small as, for example, less than 2, there is a difference in the die swell value, and hence a difference in frequency of occurrence of melt fracture in some cases. For the FEP pellet of the present invention, if the die swell is preferably 18% or more, the Mw/Mn value is not limited.

The die swell is also useful since it can be measured easily as described below. In contrast, the Mw/Mn value can be obtained, for example, by using the method of W. H. Tuminello which comprises assuming a certain statistical distribution of the viscoelastic behavior which means a certain molecular weight range (Plym. Eng. Sci. 26, 1339 (1986)). However, this method is not sufficient as a scale for strain hardening.

Preferably, the FEP pellet of the present invention has a MIT bending life of 4,000 cycles or more. If the MIT bending life is within the above range, the insulating material thus obtained maintains superior resistance to stress cracking and resistance to brittleness, so that excellent toughness can be obtained even if it is coated relatively thick. If this value is less than 4000 cycles, problems may arise when the cable is used at normal temperature or higher. If the MIT bending life is within the above range, it may be 7,000 cycles or less since it has sufficient resistance to stress cracking. The MIT bending life is preferably 4,200 to 7,000 cycles, more preferably 4,400 to 6,500 cycles.

The method for controlling the MIT bending life of the FET pellet of the present invention within the above-mentioned range is not particularly limited. For example, a conventionally well-known method for imparting resistance to stress cracking can be used.

The method for manufacturing the FEP pellet of the present invention is not particularly limited and, for example, a conventionally well-known method can be used. Such method may comprise melting and kneading a resin powder obtained in an extruder or the like while heating, for example, at a temperature not lower than the melting temperature of the FEP as well as at a temperature lower than the decomposition temperature of the above FEP, to thereby pelletize the resin powder.

The method for polymerizing the above FEP is not particularly limited, and an ordinary method of polymerizing monomer components such as emulsion polymerization, suspension polymerization, solution polymerization, block polymerization, gas phase polymerization or the like can be used.

An example of a chain transfer agent that can be used to polymerize the above-mentioned FEP includes a liquid chain transfer agent such as isoparaffin, carbon tetrachloride, diethyl malonate, mercaptan, diethyl ether, alcohol and the like. Further, as a gaseous chain transfer agent, methane, ethane and the like can be used.

Ammonium persulfate and/or potassium persulfate can be used as a polymerization initiating agent to start the polymerization reaction by initial charging. Although the initially charged polymerization initiating agent is consumed or decomposed with progression of reaction from just after the start of the reaction, by adding an appropriate amount continuously, the molecular weight, molecular weight distribution and the like can be controlled.

If suspension polymerization is used, diacyl peroxide is preferably used as the polymerization initiating agent. A suitable polymerization initiating agent is fluorine-containing peroxide represented by the formula:

$$(R_fCOO)_2$$

where $R_f$ is a perfluoroalkyl group, a hydrofluoroalkyl group or a perchlorofluoroalkyl group.

In the above-mentioned production process, the FEP pellet can be adjusted so as to obtain a volatile content, adhesive strength, MFR, die swell, MIT bending life and the like each within the above-mentioned ranges, for example, by using the processes described below, as needed.

As mentioned above, for enabling the FEP pellets to have an adhesive strength within the above-mentioned range, the FEP has the above-mentioned adhesion factors. Since the above adhesion factors are unstable with heating, volatile content can be used as one of indexes to express the content of the adhesion factors. On the other hand, in the present invention, in order to prevent spark-out and cone-breaks, the volatile content has an upper limit. Thus, the above FEP pellet contains a suitable amount of the above adhesion factor as well as a volatile content falling within the above range. The resulting FEP pellet is superior in terms of both adhesive strength and reduced cone-breaks.

In order to obtain an FEP of the invention having the above adhesion factor, a conventional terminus stabilizing treatment, which is carried out during the polymerization process to stabilize the adhesion factors, may be omitted if needed. For example, this process is suitable if the above FEP pellets having a volatile content within the above range can be obtained without carrying out the above terminus stabilizing treatment. An example of the above-mentioned terminus stabilizing treatment includes a process which comprises adding a chain transfer agent during polymerization, a process which comprises carrying out heat treatment after emulsion polymerization, a process which comprises carrying out high-temperature heat treatment after polymerization or the like.

In some cases, the above-mentioned terminus stabilizing treatment may be carried out so that not all the above-mentioned adhesion termini are stabilized but a suitable number remain to thereby decrease the extent of foaming. This is achieved by reducing the addition amount of a chain transfer agent, or by reducing the time or temperature of the terminus stabilizing treatment. This is suitable, for example, in a case where the volatile content may exceed the upper limit of the above range unless a terminus stabilizing treatment (with reduced extent) is carried out.

The FEP pellet of the present invention can be adjusted to have a melting point or MFR within the above-mentioned range by adjusting the addition amount of the chain transfer agent or the polymerization initiating agent during the polymerization reaction (to thereby adjust the molecular weight and molecular weight distribution of the above fluorine-containing copolymer). The melting point or MFR can also be set by adjusting the monomer composition of the above-mentioned FEP.

For the FEP pellet of the present invention, when a resin powder obtained by polymerization is pelletized, it is possible to adjust the extent of reduction of the volatile content index and increase in MFR by adjusting the heating temperature, heating time and the like.

The method of coating extrusion using the FEP pellet of the present invention is not particularly limited, and, for example, a conventionally well-known method can be used. A conventional extruder for coating cables may be used without particular modification. The coating speed is not particularly limited, but at a high speed such as 2,500 to 3,500 ft/min and in particular, 2,800 to 3,000 ft/min, the advantageous effects of the FEP pellet of the present invention, namely, excellent adhesive strength with the core wire and no occurrence of cone-breaks, can be realized. Needless to say, the FEP pellet of the present invention can also be effectively used in coating extrusion at lower coating speeds such as less than 2,500 ft/min. which have been employed in conventional coating extrusion, for example, approximately 1,000 to 2,500 ft/min.

The insulated cable obtained by the above-mentioned coating extrusion is not particularly limited as long as it comprises a core wire and an insulating material to cover the same, and includes, for example, a cable, a wire and the like. Examples thereof include an insulated communication wire and, for example, a cable connecting a computer and peripherals thereof, including a data transfer cable such as a LAN cable can be mentioned. It is also suitable as a plenum cable.

In the present specification, the adhesive strength between the above insulating material and the core wire, volatile content, MFR, die swell and MIT bending life are defined and measured as follows.

A) Bonding Strength, Cone-breaks and Spark-out

A-1) Conditions of Coating Extrusion of the Cable for Measurement

The above insulating materials obtained by molding under the following conditions are evaluated.
Core wire standard: AWG24
Core wire diameter: 20.1 mil (=approximately 0.51 mm)
Thickness of the insulating material: 7.5 mil (approximately 0.19 mm)
Diameter of the insulated cable: 35.1 mil (approximately 0.89 mm)
Conditions of coating extrusion
Cylinder diameter: 50 mm
L/D: 30
Temperature (° C.):
Z1: 338 Z2: 360 Z3: 371 Z4: 382 Z5: 399
CL: 404 AD: 404 HD: 404 DIE: 404
Preheating of the core wire: 165° C.
Core length: 4.7 cm
Length of air cooling: 20 ft
Inner diameter of the die: 8.71 mm, Outer diameter of the chip: 4.75 mm A-2) Cone-breaks of the Insulating Material Measurement is made using a KW32 TRIO instrument made by Zumbach.

A-3) Spark-out of the Above-mentioned Insulating Material

Measurement is made using a Model HF-20-H (2.0 KV) instrument made by CLINTON INSTRUMENT COMPANY.

A-4) Adhesive Strength of the Above Insulating Material with the Core Wire

Test specimens are prepared by cutting the insulated cable obtained in the above manner to a length of 15 cm and peeling the insulation by 7.5 cm from one end with 7.5 cm remaining, such that the specimens comprise a 7.5 cm-long insulated portion and a 7.5 cm-long uncovered core wire portion.

For the measuring device, a tensile tester type 4301, product of Instron, and a metal plate having a columnar hole as shown in the Figure are used.
Figure: Metal plate having a columnar hole
Length: 5 cm
Width: 1 cm
Thickness: 0.20 cm
Inner diameter of the columnar hole: 0.0530 cm The illustrated metal plate is fixed to a fixed chuck (lower chuck in this case) of the tensile tester so that the columnar hole is parallel to the tensile direction. The test specimens thus prepared are each inserted into the hole of the fixed metal plate from its lower end toward the upper end so that the peeled core wire portion protrudes from the top end of the hole of the metal plate with the insulated portion located below the hole. This is because the diameter of the insulated portion is larger than that of the hole. The uncovered core wire, which protrudes from the top of the hole, is clamped with a movable chuck (upper chuck in this case) and is moved upward at the speed of 50 mm/min. Since the core wire is smaller than the columnar hole, only the core wire is pulled up while peeling off the above insulating material. The force measured during this time is read. The tests are carried out for five specimens, and the average value is taken for three specimens excluding the two specimens having maximum and minimum values.

B) Volatile Content

Using an electric oven having a turntable, the volatile content (% by weight) is measured as follows. That is, as a sample, 20±0.1 g of the above FEP in the form of pellet is weighed out using a precision balance capable of measuring to an accuracy of 0.1 mg and in an aluminum cup that has been baked at 370° C. beforehand in an empty state. The letter A used herein indicates the weight of the baked aluminum cup, and the letter B indicates the weight of the aluminum cup in which the sample is placed. As for B, two aluminum cups containing a sample per each sample to be measured are prepared and an average value of two cups is used. On this occasion, a standard sample having a known volatile content is also weighed out at the same time as a control. These are quickly put on the turntable of the electric oven, which has been heated to 370° C. At this time, the rotation speed of the turntable is 6 rpm.

30 minutes after the internal temperature has returned to 370° C., the cups containing simple product removed from are taken out of the oven and quickly put in a desiccator, in which they are left for over an hour to cool down. Then, the weight of the sample is accurately weighed by the above precision scale. The letter C denotes their weights at this time.

The weight reduction of the sample after heating for 30 minutes at 370° C. is calculated by the following formula and is referred as the volatile content (% by weight):

$$\text{Volatile content (\% by weight)} = ((B-C)/(B-A)) \times 100$$

C) MFR

Using a melt index tester in compliance with ASTM D 1238-98 or JIS K 7210, approximately 6 g of resin is charged into a cylinder having an inner diameter of 0.376 inch and maintained at 372° C.±0.5° C., and allowed to adjust for five minutes until an equilibrium temperature is reached. Then, the resin is extruded through an orifice having a diameter of 0.0825 inch and a length of 0.315 inch under a piston load of 5,000 g, and the weight of the resin (unit: g) collected in a unit period of time (usually 10 to 60 seconds) is measured. The three measured values are averaged and converted to the extrusion amount per 10 minutes as the MFR (unit: g/10 min.).

D) Die Swell

Die swell is defined as "% expansion" in Japanese Kokoku Publication Sho-48-20788, and it is expressed as "expansion rate" in Japanese Kokoku Publication Hei-2-7963. The die swell is measured as follows.

Using the same melt index tester as used above in the measurement of MFR, approximately 6 g of resin is charged into a 0.376-inch cylinder maintained at 372° C.±0.5° C., and is allowed to adjust for five minutes until an equilibrium temperature state is reached. Then, the resin is extruded through an orifice for die swell measurement having a diameter of 1 mm (error +0.002 mm or less) and a land length of 1.05 mm (error ±0.05 mm) under a piston load of 5,000 g. After the extruded strand is cooled to room temperature, its diameter is measured.

The strand length in this case is 30±5 mm, and the diameter at a portion approximately 5±1 mm above the front end (the portion that has been extruded first) is considered to be the diameter of the strand. The diameters of three such strands collected at the same time are measured and averaged, and the die swell is calculated according to the following equation.

Die swell (%)=((SD−OD)/OD)×100

SD: diameter of the strand (average of three strands)
OD: diameter of the orifice (1.000±0.002 mm)
E) MIT Bending Life This measurement is made using a standard MIT folding endurance tester described in ASTM D 2176-97. The measurement is made using a compression-molded film quickly cooled in cold water. The film has a thickness of approximately 0.008±0.0005 inch (0.20±0.013 mm).

F) Number of Groups at the Adhesion Terminus

The resin is compression-molded at as low a temperature as possible within a range such that the resin is moldable between the melting point of the resin and 350° C. to thereby form a film having a thickness of 250 to 300 $\mu$m. The infrared absorption spectrum of this film is measured and compared with the infrared spectrum of a sample not containing end groups that are present in this film to determine the kind of end groups. Then, from their differential spectra, the number of adhesion termini is calculated according to the following equation.

Number of end groups (per $10^6$ carbon atoms)=(l·k/t)

l: absorbance
k: corrective coefficient
t: film thickness (mm)

The corrective coefficients of the target end groups are shown below. These corrective coefficients are determined based on the infrared absorption spectrum of model compounds for calculating the number of end groups per $10^6$ carbon atoms. The infrared absorption spectrum are measured by scanning 10 times using a Perkin-Elmer (FT-IR Spectrometer 1760X).

| Terminus group | Number of absorbed waves (cm$^{-1}$) | Corrective coefficient |
| --- | --- | --- |
| —COF | 1883 | 388 |
| —COOH (free) | 1815 | 440 |
| —COOH (bonded) | 1775 | 440 |
| —CH$_2$OH | 3648 | 2300 |

EFFECT OF THE INVENTION

The FEP pellet of the present invention restricts the volatile content within the above-specified range, increases the adhesive strength between the above insulating material and the core wire to within the above-specified range, and suppresses the occurrence of cone-breaks within the above-specified range. Thus, even in cases where the coating extrusion is carried out at a high coating speed as described above, melt fracture will not occur and high-speed coating extrusion can be carried out. Further, the above insulating material and the insulated cable thus obtained have superior physical properties such as mechanical strength and electrical properties, so that they can sufficiently withstand long-term use.

Thus, the FEP pellet of the present invention can be suitably used for coating extrusion of cables. The effects of the present invention are manifest especially in case of high-speed molding.

The insulating material formed from the above FEP pellet is also an embodiment of the present invention.

An insulated cable formed from the above FEP pellet is an additional embodiment of the present invention.

EXAMPLES

The present invention is described in further detail by means of the following Examples. However, the present invention should not be construed as being limited thereto.

Example 1
(Manufacturing of Modified FEP Powder)

310 kg of pure water and 200 g of ω-hydrofluorocarboxylic acid were charged into a 1,000 L glass lined autoclave having a stirrer. After purging with nitrogen, a vacuum was established, and 320 kg of hexafluoropropylene (HFP) and 3 kg of perfluoro(propyl vinyl ether) (PPVE) as a perfluoro(alkyl vinyl ether) (PFAVE) were charged thereto. Stirring was started, the temperature of the polymerizing vessel was set at 35.0° C., and the pressure was increased to 10.5 MPaG with perfluoroethylene (TFE). Then, when 3.8 kg of di-(ω-hydrodecafluoroheptanol) peroxide (DHP) diluted to approximately 8 wt % with perfluorohexane was added, the reaction began immediately. During the reaction, TFE was additionally charged in an amount of 310 kg to maintain the pressure in the autoclave at 10.5 MPaG. During the reaction, when the amount of TFE supplied reached 25 wt %, 50 wt % and 75 wt % of the reaction mixture, PPVE was charged in an amount of 800 g at each time interval. Also, 2 and 4 hours after the start of the reaction, DHP was added each time in an amount of 3.8 kg, and six hours after the start of the reaction and every two hours thereafter, DHP was added in an amount of 1.9 kg, respectively. In order to adjust the molecular weight, 1.3 kg of methanol was added as a chain transfer agent 15 hours after the start of the reaction.

After a total reaction time of 28 hours, non-reacted TFE and HFP were released to obtain a granular powder. Pure water was added to this powder, and after stirring and washing, it was removed from the autoclave. The powder was then dried for 24 hours at 150° C. to obtain 385 kg of the above-mentioned modified FEP powder.
(Evaluation of the Physical Properties of the Modified FEP Powder)

The resulting modified FEP powder measured as described above had a composition weight ratio of TFE:HFP:PPVE of 86.1:13.0:0.9, an MFR of 33.7 (g/10 min.), a die swell of 32.3%, and a volatile content of 0.911% by weight.
(Pelletization and Evaluation of Physical Properties)

Using a 50 mm-diameter extruder having a barrel to die temperature set at 360° C., the above modified FEP powder was pelletized at a speed of 12 kg/hour, and then deaeration was carried out for 8 hours at 230° C. For the pellets by the above-mentioned process, the MFR was 40.4 (g/10 min.), the die swell was 22.1%, and the volatile content was 0.135% by weight. As the above adhesion termini, the numbers of the respective groups —COF, —COOH and —CH$_2$OH were measured as described above, and the results are shown in Table 1.
(Coating Extrusion)

Thereafter, cable coating (molding) was carried out at respective coating speeds of 1,600, 2,000, 2400 and 2,800 ft/min. under the above-described conditions. For each coating speed, the number of spark-outs and cone-breaks as well as the adhesive strength between the above insulating material and the core wire per 30 minutes of the coating operation were evaluated as described above. The number of spark-outs and cone-breaks convert to the number of spark-outs and cone-breaks per 100,000 ft of the coated cable. The results are shown in Table 1.

Example 2

Except that methanol was added in an amount of 1 kg, and the time at which methanol was added was changed to 16 hours after the start of the reaction, the procedure of Example 2 was the same as Example 1.

Example 3

Except that perfluoro(ethyl vinyl ether) (PEVE) was used instead of PPVE, methanol was added in an amount of 1.1 kg, and the time at which methanol was added was changed to 16 hours after the start of the reaction, the procedure of Example 3 was the same as Example 1.

Example 4

Except that methanol was added in an amount of 2 kg, and the time at which methanol was added was changed to 20 hours after the start of the reaction, the procedure of Example was the same as Example 1.

Example 5

Except that PFAVE was not added, the procedure of Example 5 was the same as Example 1.

Example 6

Except that the temperature of the polymerizing vessel was changed to 34° C., PPVE was initially added in an amount of 4 kg and in amounts of 1,000 g at the predetermined intervals after the start of the reaction, methanol was added in an amount of 8.1 kg, and the time at which methanol was added was changed to 10 hours after the start of the reaction, the procedure of Example 6 was the same as Example 1.

Comparative Example 1

Except that the extrusion speed for pelletization was changed to 17 kg/hour, the procedure of Comparative Example 1 was the same as Example 1.

Comparative Example 2

Except that methanol was added in an amount of 3.4 kg, and the time at which methanol was added was changed to 8 hours after the start of the reaction, the procedure of Comparative Example 2 was the same as Example 6.

Comparative Example 3

Except that methanol was added in an amount of 0.8 kg, and the time at which methanol was added was changed to 16 hours after the start of the reaction, the procedure of Comparative Example 3 was the same as Example 3.

Comparative Example 4

Except that the temperature of the polymerizing bath was changed to 34° C., methanol was added in an amount of 5.9 kg, and the time at which methanol was added was changed to 8 hours after the start of the reaction, the procedure of Comparative Example 4 was the same as Example 1.

TABLE 1

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Polymerization | | | | | | | | | | | |
| Water | (kg) | 310 | 310 | 310 | 310 | 310 | 310 | 310 | 310 | 310 | 310 |
| Temperature | (° C.) | 35 | 35 | 35 | 35 | 35 | 34 | 35 | 34 | 35 | 34 |
| HFP | (kg) | 320 | 320 | 320 | 320 | 320 | 320 | 320 | 320 | 320 | 320 |
| Pressure | (MPaG) | 10.5 | 10.5 | 10.5 | 10.5 | 10.5 | 10.5 | 10.5 | 10.5 | 10.5 | 10.5 |
| PPVE | (kg) | 3 | 3 | — | 3 | 0 | 4 | 3 | 4 | — | 3 |
| PPVE (each interval) | (g) | 800 | 800 | — | 800 | 0 | 1000 | 800 | 1000 | — | 800 |
| PEVE (initial period) | (kg) | — | — | 3 | — | — | — | — | — | 3 | — |
| PPVE (each interval) | (g) | — | — | 800 | — | — | — | — | — | 800 | — |
| DHP (initial period, after 2 & 4 hours) | (kg) | 3.8 | 3.8 | 3.8 | 3.8 | 3.8 | 3.8 | 3.8 | 3.8 | 3.8 | 3.8 |
| DHP (after 6 hours) | (kg) | 1.9 | 1.9 | 1.9 | 1.9 | 1.9 | 1.9 | 1.9 | 1.9 | 1.9 | 1.9 |
| Methanol | (kg) | 1.3 | 1 | 1.1 | 2 | 1.3 | 8.1 | 1.3 | 3.4 | 0.8 | 5.9 |
| Time period after reaction when methanol is added | (hours) | 15 | 16 | 16 | 20 | 15 | 10 | 15 | 8 | 16 | 8 |
| Total period of reaction | (hours) | 28 | 28 | 27 | 28 | 30 | 25 | 28 | 24 | 25 | 22 |
| Yield | (kg) | 358 | 359 | 351 | 362 | 350 | 357 | 358 | 358 | 354 | 358 |
| Powder | | | | | | | | | | | |
| MFR | (g/10 min.) | 33.7 | 26 | 25 | 30 | 28.5 | 27.7 | 33.7 | 27.6 | 22.6 | 18.5 |
| HFP/PPVE(or PEVE) | (% by weight) | 13.0/0.9 | 13.0/0.9 | 13.0/0.9 | 13.0/0.9 | 13.7/0.0 | 11.5/1.2 | 13.0/0.9 | 11.5/1.2 | 13.0/0.9 | 11.7/1.0 |

TABLE 1-continued

|  |  | Example ||||||| Comparative Example ||||
|---|---|---|---|---|---|---|---|---|---|---|---|
|  |  | 1 | 2 | 3 | 4 | 5 | 6 | 1 | 2 | 3 | 4 |
| Die swell | (%) | 32.3 | 34.2 | 33.8 | 48 | 36.2 | 25.2 | 32.3 | 24.6 | 31.3 | 32.1 |
| Volatile content | (% by weight) | 0.911 | 0.925 | 0.835 | 0.925 | 0.865 | 0.655 | 0.911 | 0.672 | 0.835 | 0.593 |
| Pelletization |  |  |  |  |  |  |  |  |  |  |  |
| Extrusion temperature | (° C.) | 360 | 360 | 360 | 360 | 360 | 360 | 360 | 360 | 360 | 360 |
| Extrusion speed | (kg/hour) | 12 | 12 | 12 | 12 | 12 | 12 | 17 | 12 | 12 | 12 |
| Deaeration time | (hours) | 8 | 8 | 8 | 8 | 8 | 8 | 8 | 8 | 8 | 8 |
| Pellet |  |  |  |  |  |  |  |  |  |  |  |
| MFR | (g/10 min.) | 40.4 | 32.5 | 31.1 | 37.5 | 35.1 | 35.6 | 36.1 | 33.2 | 28.3 | 25 |
| Die swell | (%) | 22.1 | 23.5 | 22.6 | 34 | 25.6 | 22.3 | 24.1 | 16 | 20.8 | 24.7 |
| Volatile content | (% by weight) | 0.135 | 0.162 | 0.152 | 0.144 | 0.142 | 0.147 | 0.213 | 0.128 | 0.158 | 0.162 |
| Melting point | (° C.) | 247.2 | 248.1 | 246.5 | 247.5 | 250.1 | 255.3 | 247 | 256.1 | 248.1 | 256.2 |
| Adhesion terminus group (per $10^6$ carbon atoms) |  |  |  |  |  |  |  |  |  |  |  |
| —COF | (number) | 4 | 3 | 4 | 4 | 3 | 4 | 1 | 1 | 3 | 2 |
| —COOH | (number) | 3 | 2 | 1 | 2 | 6 | 3 | 3 | 2 | 1 | 1 |
| —CH$_2$OH | (number) | 65 | 53 | 67 | 53 | 49 | 125 | 72 | 112 | 46 | 105 |
| MIT bending life | (cycle) | 4808 | 6142 | 4569 | 5316 | 1113 | 5515 | 4725 | 5146 | 4569 | 6497 |
| Evaluation of insulated cable for each coating speed (ft/min) (number per 100,000 ft for spark-out and cone-breaks) |  |  |  |  |  |  |  |  |  |  |  |
| 1600 (ft/min.) Spark-outs | (number) | 1 | 2 | 1 | 1 | 1 | 0 | 12 | 0 | 1 | 8.6 |
| Adhesive strength | (kg) | 2.2 | — | — | — | — | — | — | — | — | — |
| Cone-breaks | (number) | 0 | 0 | 0 | 0 | 0 | 0 | 0 | 0 | 0 | 0 |
| 2000 (ft/min.) Spark-outs | (number) | 2 | 3 | 1 | 1 | 6 | 4 | 15 | 4.7 | 1 | 11.8 |
| Cone-breaks | (number) | 0 | 0 | 0 | 0 | 0 | 0 | 1 | 0 | 0 | 0 |
| 2400 (ft/min.) Spark-outs | (number) | 4 | 3 | 2 | 3 | 7 | 3 | — | 8.7 | 2 | 17.5 |
| Adhesive strength | (kg) | 1.9 | — | — | — | — | — | — | — | — | — |
| Cone-breaks | (number) | 0 | 0 | 0 | 0 | 0 | 0 | — | 0 | 0 | 1 |
| 2800 (ft/min.) Spark-outs | (number) | 6 | 4 | 3 | 4 | 6 | 4 | — | 10 | 14 | 25 |
| Adhesive strength | (kg) | 1.7 | 1.5 | 1.4 | 1.8 | 1.5 | 1.3 | — | 1.1 | 1 | 0.8 |
| Cone-breaks | (number) | 0 | 0 | 0 | 0 | 0 | 0 | — | 3 | 4 | 7 |

In Table 1, HFP/PPVE (PEVE) is the content of HFP and PPVE or PEVE units (% by weight) in terms of all monomer components constituting the FEP pellets thus prepared.

Table 1 shows that all of the Examples of the present invention are superior, in terms of spark-out, cone-breaks and adhesive strength between the insulating material and the core wire, whereas Comparative Example 1 having a high volatile content, Comparative Example 2 having a low die swell, and Comparative Examples 3 and 4 having a large MFR were each inferior in at least one of the evaluation criteria. Also, it is apparent that Example 3, which has a large MFR as compared to Comparative Example 3, was free of cone-breaks.

Example 7 and Comparative Example 5
(Manufacturing of a Dispersion Solution of an FEP Copolymer Containing FEP Copolymer Seed Particles)

A 50-L stainless autoclave with a stirrer was deaerated, and then charged with 30 kg of deaerated distilled water and 8 kg of a 10% by weight aqueous solution of fluorine surfactant ($C_7F_{15}COONH_4$). Further, 5 kg of HFP (liquid) and then a gaseous TFE-HFP mixed monomer (TFE:HFP= 86:14 in weight ratio) were charged to the autoclave. The temperature was raised gradually with stirring. As a result, the pressure of the atmosphere in the autoclave was raised to 1.5 MPaG at 95° C.

As an initiator, an ammonium persulfate aqueous solution (APS)(10% by weight) was charged in an amount of 3.5 kg to start the reaction. The above mixed monomer was continuously supplied to keep the pressure at 1.5 MPaG. Stirring was stopped 30 minutes later, and non-reacted TFE and HFP were collected to obtain 31.4 kg of a dispersion solution of an FEP copolymer having a polymer solids content of 4.5% by weight. This dispersion solution is referred to as an FEP copolymer dispersion solution containing FEP copolymer seed particles.

Some of the dispersion solution was coagulated using nitric acid to obtain a white powder. The composition of the copolymer thus obtained had a weight ratio of TFE:HFP= 86.0:14.0. It was impossible to measure the MFR, die swell and volatile content.

(Manufacturing of Modified FEP Powder)

Next, a 50-L stainless autoclave equipped with a stirrer was deaerated and charged with 30 kg of deaerated distilled water and then with 1 kg of the FEP copolymer dispersion solution containing FEP copolymer seed particles that had been prepared beforehand. Further, 6.9 kg of HFP (liquid), and then 0.2 kg of PPVE, and then a gaseous TFE-HFP mixed monomer (TFE:HFP=86:14 in weight ratio) were charged to the autoclave. The temperature was raised gradually with stirring, and the pressure of the atmosphere in the autoclave was raised to 4.2 MPaG at 95° C.

APS (10% by weight; 1.0 kg) was then charged to the autoclave and the reaction was started. Upon start of the reaction, a gaseous TFE-HFP mixed monomer having the same composition as mentioned above was continuously supplied so as to maintain a pressure of 4.2 MpaG. Further, each time the amount of the TFE-HFP mixed monomer that has been supplied during the reaction reached 25, 50 and 75 wt % of the reaction mixture, PPVE was charged in an amount of 20 g at each time interval. Polymerization was continued until the solids content of the polymer reached 20% by weight. The total reaction time was 45 minutes.

Thereafter, non-reacted TFE and HFP were collected, and the dispersion was removed and coagulated with nitric acid to obtain a white powder. The amount of the modified FEP after drying was 7.7 kg.

(Evaluation of the Physical Properties of the Modified FEP Powder, End Stabilizing Treatment, and Pelletization)

For the modified FEP obtained by the above methods, the weight ratio of TFE:HFP:PPVE was 86.1:12.9:1.0, MFR was 33 (g/10 min.), and the die swell was 34.0%.

As an end stabilizing step, this modified FEP powder was subjected to wet heat treatment while varying the treatment period, and then melted, pelletized and deaerated to obtain two samples. The sample which was subjected to wet heat treatment for 45 minutes at 380° C. under atmospheric pressure is referred to as Example 7, and the sample which was subjected to wet heat treatment for an hour is referred to as Comparative Example 5. The results are shown in Table 2.

(Evaluation of Physical Properties and Coating Extrusion)

In the same manner as in Example 1, various physical properties were measured, cable extrusion coating was carried out, and various criteria were evaluated including spark-out. The results are shown in Table 2.

TABLE 2

| | | Example 7 | Comparative Example 5 |
|---|---|---|---|
| Polymerization | | | |
| Water | (kg) | 30 | 30 |
| Seeds (4.5%) | (kg) | 1 | 1 |
| Temperature | (° C.) | 95 | 95 |
| HFP | (kg) | 6.9 | 6.9 |
| Pressure | (MPaG) | 4.2 | 4.2 |
| PPVE (initial period) | (kg) | 0.2 | 0.2 |
| PPVE (each interval) | (g) | 20 | 20 |
| APS (10%) | (kg) | 1 | 1 |
| Total reaction time | (hour) | 45 | 45 |
| Yield | (kg) | 7.7 | 7.7 |
| Powder | | | |
| MFR | (g/10 min.) | 33 | 33 |
| HFP/PPVE | (% by weight) | 12.9/1.0 | 12.9/1.0 |
| Die swell | (%) | 34 | 34 |
| Volatile content | (% by weight) | — | — |

TABLE 2-continued

| | | Example 7 | Comparative Example 5 |
|---|---|---|---|
| Pelletization | | | |
| Wet heat treatment time | (min.) | 45 | 60 |
| Extrusion temperature | (° C.) | 360 | 360 |
| Extrusion time | (kg/hour) | 12 | 12 |
| Deaeration time | (hour) | 8 | 8 |
| Pellet | | | |
| MFR | (g/10 min.) | 34.5 | 35.1 |
| Die swell | (%) | 24 | 21 |
| Volatile content | (% by weight) | 0.13 | 0.06 |
| Melting point | (° C.) | 248.5 | 247.6 |
| Adhesion terminus groups (per $10^6$ carbon atoms) | | | |
| —COF | (number) | 0 | 0 |
| —COOH | (number) | 21 | 0 |
| —CH$_2$OH | (number) | — | — |
| MIT bending life | (cycles) | 6127 | 6525 |
| Evaluation of covered cable for each covering speed (ft/min) | | | |
| 1600 (ft/min) Spark-outs | (number) | 3 | 2 |
| Adhesive strength | (kg) | — | 1.9 |
| Cone-breaks | (number) | 0 | 0 |
| 2000 (ft/min) Spark-outs | (number) | 9 | 4 |
| cone-breaks | (number) | 0 | 0 |
| 2400 (ft/min) Spark-outs | (number) | 10 | 2 |
| Adhesive strength | (kg) | — | 1 |
| cone-breaks | (number) | 0 | 0 |
| 2800 (ft/min) Spark-outs | (number) | 15 | 5 |
| Adhesive strength | (kg) | 1.1 | 0.5 |
| cone-breaks | (number) | 0 | 0 |

Note: Spark-outs and cone-breaks are numbers per 100,000 ft.

In Table 2, HFP/PPVE is the content of HFP and PPVE units (% by weight) of the above modified FEP thus obtained in terms of all constituent monomer components. Table 2 shows that Comparative Example 5 in which the end stabilizing treatment time was long had almost no adhesive strength and was inferior in adhesion strength to Example 7 in which the end stabilizing treatment time was short.

It should further be apparent to those skilled in the art that various changes in form in detail of the invention as shown and described above may be made. It is intended that such changes be included within the spirit and scope of the claims appended hereto.

What is claimed is:

1. An FEP pellet having a volatile content of 0.2% by weight or less, wherein said FEP pellet satisfies the following requirements (i) and (ii) when used to form an insulating material coating a core wire by extrusion coating at a coating speed of 2,800 ft/min.:
   (i) an adhesive strength between said insulating material and said core wire of 0.8 kg or more; and
   (ii) an average number of cone-breaks in said insulating material of one or less per 50,000 ft of the coated core wire.

2. The FEP pellet as claimed in claim 1, having a melt flow rate of 30 (g/10 minutes) or more.

3. The FEP pellet as claimed in claim 1, having a die swell of 18 to 35%.

4. The FEP pellet as claimed in claim 2, having a die swell of 18 to 35%.

5. The FEP pellet as claimed in claim 3, having an MIT bending life of 4,000 cycles or more, and said FEP pellet comprising a tetrafluoroethylene/hexafluoro-propylene copolymer modified with perfluoro(alkyl vinyl ether).

6. The FEP pellet as claimed in claim 4, having an MIT bending life of 4,000 cycles or more, and said FEP pellet comprising a tetrafluoroethylene/hexafluoro-propylene copolymer modified with a perfluoro(alkyl vinyl ether).

7. The FEP pellet as claimed in claim 5, wherein said perfluoro(alkyl vinyl ether) is perfluoro(propyl vinyl ether).

8. The FEP pellet as claimed in claim 6, wherein said perfluoro(alkyl vinyl ether) is perfluoro(propyl vinyl ether).

9. An insulating material formed from the FEP pellet as claimed in claim 1.

10. An insulated cable comprising a core wire extrusion coated with an insulating material prepared from the FEP pellet as claimed in claim 1.

11. A process for insulating a core wire, which comprises extrusion coating the core wire with a molten insulating material comprising the FEP pellet as claimed in claim 1.

\* \* \* \* \*